June 19, 1956     C. B. SPANGENBERG     2,751,522
SIGNAL LIGHT SYSTEM FOR MOTOR VEHICLES
Filed Sept. 5, 1951
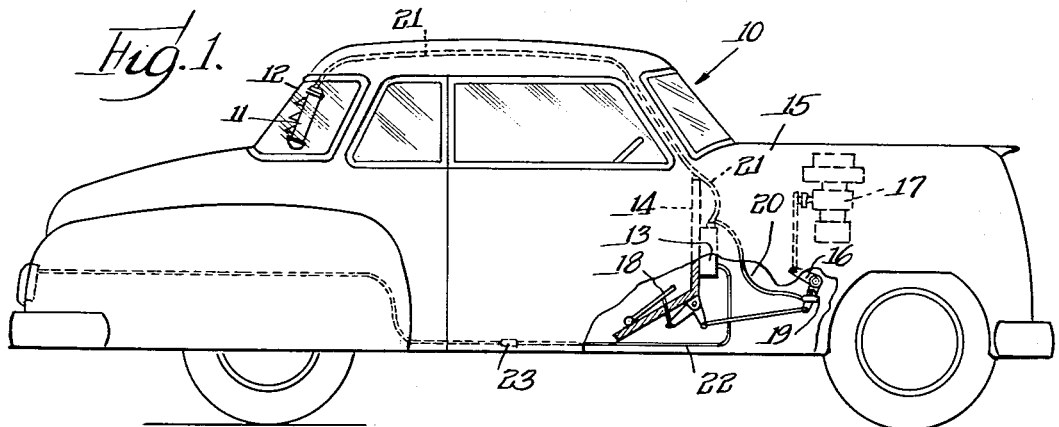
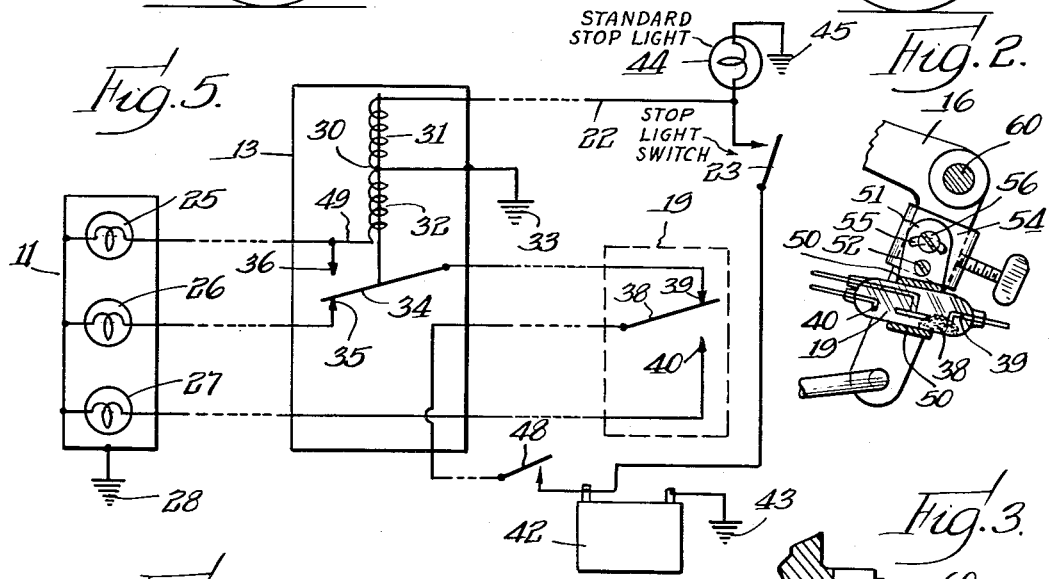
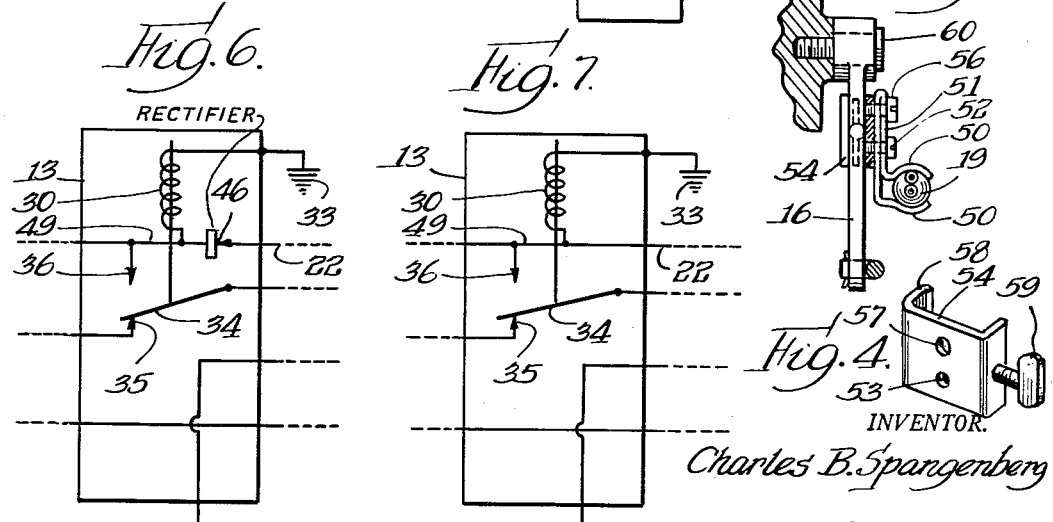
INVENTOR.
*Charles B. Spangenberg*
By: *Wallenstein & Spangenberg*
                     *Attys*

United States Patent Office 2,751,522
Patented June 19, 1956

2,751,522

SIGNAL LIGHT SYSTEM FOR MOTOR VEHICLES

Charles B. Spangenberg, Chicago, Ill., assignor, by mesne assignments, to Auto Lamp Manufacturing Company, Chicago, Ill., a copartnership Application September 5, 1951, Serial No. 245,119

15 Claims. (Cl. 315—79)

This invention relates to a signal light system for a motor vehicle such as an automobile or the like for advising operating conditions to following vehicles.

The signal light system of this invention includes red, amber and green signal lights facing the rear of the motor vehicle which are controlled through switching means by the brake and accelerator mechanisms of the motor vehicle, the arrangement being such that the green signal light is illuminated to signal normal progress or safety when the accelerator is depressed, the amber signal light is illuminated to signal coasting, slowdown or caution when the accelerator is released, and the red signal light is illuminated to signal stopping or danger when the brakes are applied. In accordance with the preferred form of this invention the red signal light remains illuminated after the brakes are released until the accelerator is again depressed to illuminate the green signal light. In another form of this invention the amber signal light is illuminated upon release of the brakes. Either of these latter sequences of operation can be obtained by a simple change in the switching means.

The principal object of this invention is to provide an improved signal light system for a motor vehicle which is simple and rugged in construction and foolproof in operation, which may be inexpensively manufactured, and which may be quickly and inexpensively installed as original equipment or as an accessory to a motor vehicle.

The signal light system includes two main components, a signal light housing having the red, amber and green signal lights and a relay mechanism and switching means for controlling the signal lights. The signal light housing is arranged at the rear of the motor vehicle with the signal lights thereof rearwardly exposed. The relay mechanism is mounted in any convenient place under the hood of the motor vehicle adjacent the accelerator mechanism. A switching means, preferably in the form of a mercury switch, is permanently electrically connected to the relay mechanism, and is mounted on a pivoted lever of the accelerator mechanism to be tilted thereby as the accelerator is depressed and released. Suitable electrical connections extend from the relay mechanism to the signal lights of the signal light housing and to the voltage source of the vehicle. The relay coil of the relay is electrically connected to the standard stop light switch to be energized and controlled thereby.

The switching means of the relay and the mercury switch operated by the accelerator are both single pole double throw switches and they are electrically connected in series between the motor vehicle voltage source and the red, amber and green signal lights so that the green signal light is illuminated when the accelerator is depressed, the amber signal is illuminated when the accelerator is released, and the red signal light is illuminated when the brakes are applied. Preferably an electrical connection is provided between the relay coil and the single pole double throw switch operated thereby for maintaining the relay energized after it has been energized by the standard stop light switch until the single pole double throw mercury switch is tilted by the accelerator mechanism to illuminate the green signal light. This maintains the red signal light illuminated after release of the motor vehicle brakes until the motor vehicle accelerator is depressed to illuminate the green signal light. By eliminating this latter electrical connection this latter sequence of operation is altered to allow the amber signal light to be illuminated upon release of the brakes.

Preferably, the operation of the standard stop light is isolated from the operation of the red signal light, so that even though the red signal light remains illuminated following release of the brakes, the standard stop light is extinguished. This may be accomplished by splitting the relay coil into two coils, one being connected to the standard stop light switch and the other being connected to the single pole double throw relay switch. This may also be accomplished by placing a rectifier in the connection between the relay coil and the standard stop light switch. If it be desired to have the standard stop light operate synchronously with the red signal light, these isolating means may be eliminated.

By making the accelerator operated single pole double throw switch a mercury switch which is carried by a pivoted lever of the accelerator mechanism, moving parts for operating the switch are eliminated thereby greatly reducing the costs of manufacture and installation of the signal light system of this invention.

Further objects of this invention reside in the details of construction of the signal light system, the cooperative relationships between the component parts thereof and the ready adaptability of this signal light system to motor vehicles for signalling purposes.

Other objects and advantages of this invention will become apparent to those skilled in the art upon reference to the accompanying specification, claims and drawing, in which:

Fig. 1 is an elevational view of an automobile having the signal light control system of this invention applied thereto;

Fig. 2 is an elevational view illustrating the manner in which the single pole double throw mercury switch is secured to a pivoted lever of the accelerator linkage mechanism;

Fig. 3 is an elevational view partly in section looking from the left in Fig. 2;

Fig. 4 is a perspective view of a clamping member utilized in Figs. 2 and 3;

Fig. 5 is a wiring diagram illustrating the preferred form of the signal light system of this invention;

Fig. 6 is a view of another form of relay mechanism which may be utilized in the signal light system of Fig. 5; and Fig. 7 is a view of still another form of relay mechanism which also may be utilized in the signal light system of Fig. 5.

Referring first to Fig. 1, the signal light system of this invention is shown to be applied to a motor vehicle such as an automobile, generally designated at 10. It includes a signal light housing 11 which is suspended in the automobile adjacent the rear window 12 thereof with the signal lights facing outwardly through the rear window. This signal light housing 11 may take the form shown and described in the copending application of Oscar W. Dorfman and Ernest Peters, Ser. No. 245,196, filed September 5, 1951. In the event of original equipment the signal light housing 11 may be suitably built into the rear of the automobile 10.

The signal light system of this invention also includes a relay mechanism 13 which is suitably secured under the hood 15 of the automobile as, for example, to the fire wall 14. The relay mechanism 13 is preferably located adjacent the accelerator linkage mechanism extending between the carburetor 17 and the accelerator 18. Such linkage mechanisms usually include a pivoted lever such as the lever 16 illustrated in Fig. 1. A single pole double throw switch is operated by the accelerator linkage mechanism and, in this respect, this switch preferably comprises a mercury switch 19 suitably secured to the pivoted lever 16 for tilting thereby. The mercury switch 19 is permanently connected by wires 20 to the relay mechanism 13 and the relay mechanism 13 is in turn connected by wires 21 to the signal lights within the signal light housing 11, the wires 21 extending along the top of the automobile. The standard stop light switch 23 is suitably connected by a wire 22 to the relay mechanism 13.

Referring now to the preferred form of the signal light system illustrated in Fig. 5, the signal light housing 11 includes red, amber and green signal lights 25, 26 and 27, respectively, the signal lights and the housing being connected to ground, as indicated at 28. The relay mechanism 13 includes a relay coil 30 having a pair of coil windings 31 and 32 for operating an armature carrying a contact 34 for moving the contact 34 into engagement with spaced contacts 35 and 36. When the relay coil 30 is deenergized, the contact 34 normally engages the contact 35 and when either relay coil winding 31 or 32 is energized, the contact 34 engages the contact 36. The center of the relay coil 30, that is the juncture of the relay coil windings 31 and 32, and the housing of the relay mechanism 13 are connected to ground, as indicated at 33.

The single pole double throw switch 19 operated by the accelerator includes a contact 38 adapted to engage spaced contacts 39 and 40, the arrangement being such that when the accelerator is released the contact 38 engages the contact 39 and when the accelerator is depressed the contact 38 engages the contact 40.

The motor vehicle voltage source may comprise a battery 42 having the negative terminal thereof connected to ground, as indicated at 43. The positive terminal of the battery 42 is connected through the standard stop light switch 23 and the standard stop light 44 to ground, as indicated at 45. Thus when the standard stop light switch 23 is closed upon application of the motor vehicle brakes, the standard stop light 44 is illuminated. The standard stop light switch 23 is also connected by the conductor 22 to one end of the relay coil 31, the other end of which is connected to ground, as indicated at 33. Thus, when the standard stop light switch 23 is closed, the relay coil 31 is energized to move the contact 34 into engagement with the contact 36. The positive terminal of the battery 42 is also connected through the standard ignition switch 48 to the contact 38 of the accelerator operated single pole double throw switch. The contact 40 of that switch is connected to the green signal light 27 and the contact 39 thereof is connected to the contact 34 of the single pole double throw switch of the relay mechanism 13. The contact 35 of the relay switch is connected to the amber signal light 26 and the contact 36 thereof is connected to the red signal light 25. Also, the contact 36 is electrically connected by a conductor 49 to one end of the relay coil 32, the other end of which is grounded, as indicated at 33.

When the accelerator of the motor vehicle is depressed a circuit is completed from the positive terminal of the battery 42 through ignition switch 48, contacts 38 and 40 and the green signal light 27 to ground for illuminating the green signal light to signal normal progress or safety. When the accelerator is released a circuit is completed from the positive terminal of the battery 42 through the ignition switch 48, contacts 38 and 39, contacts 34 and 35 and the amber signal light 26 to ground to illuminate the amber signal light for signalling coasting, slowdown or caution. When the motor vehicle brakes are applied the relay coil 31 is energized to move the contact 34 into engagement with the contact 36 for completing a circuit from the positive terminal of the battery 42 through the ignition switch 48, contacts 38 and 39, contacts 34 and 36 and the red signal light 25 to ground for illuminating the red signal light to signal stopping or danger. At the same time another circuit is completed from the positive terminal of the battery 42 through the ignition switch 48, contacts 38 and 39, contacts 34 and 36, electrical connection 49 and the other relay coil 32 to ground. This circuit maintains the relay energized even though the standard stop light switch 23 is opened upon release of the brakes to deenergize the relay coil 31. As a result, a red signal light remains illuminated even though the brakes are subsequently released until such time as the accelerator is depressed to move the contact 38 into engagement with the contact 40 for the purpose of illuminating the green signal light 47. The reason for forming the relay coil 30 into two relay coils 31 and 32 is to isolate the operation of the standard stop light 44 from the operation of the red signal light 25 for here it is possible to extinguish the standard stop light 44 when the brakes are released and yet maintain illuminated the red signal light 25.

Referring now more particularly to Fig. 6, there is disclosed another relay mechanism which may be substituted for the relay mechanism in the signal light system illustrated in Fig. 5. This relay mechanism differs from the one of Fig. 5 by having a single relay coil 30, one end of which is connected to ground, as indicated at 33, and the other end of which is connected by the conductor 49 to the contact 36. Interposed in the electrical connection 22 between the standard stop light switch 23 and the relay coil 30 is a rectifier 46 which will pass current from the standard stop light circuit through the relay coil 30, but which will block the passage of current from the contact 36 to the standard stop light circuit. This rectifier operates as an isolating means to isolate the operation of the standard stop light 44 from the operation of the red signal light 25 so that the red signal light 25 may remain illuminated after release of the brakes while the standard stop light 44 is extinguished. The same results are accomplished by the relay mechanism of Fig. 6 as by the relay mechanism of Fig. 5.

Fig. 7 illustrates a relay mechanism very much like that of Fig. 6 and which may be substituted for the relay mechanism of Fig. 5. Here a single relay coil 30 is utilized and the rectifier 46 is omitted. Thus, the ungrounded end of the relay coil 30 is directly connected to the contact 36 and to the standard stop light circuit. In this arrangement when the brakes are applied and the relay coil 30 is energized to move the contact 34 into engagement with the contact 36 for illuminating the red signal light 25, the maintaining circuit for the relay is completed through the contacts 34 and 36, electrical connections 49 and the relay coil 30 to ground 33 for maintaining the relay energized and the red signal light illuminated even though the vehicle brakes are released. At this same time a circuit is also completed from the contacts 34 and 36 through the electrical connections 49 and 22 and the standard stop light 44 to ground for maintaining the standard stop light 44 illuminated, as well as the red signal light 25, even though the brakes are released.

If the electrical connection 49 between the contact 36 and the ungrounded end of the relay coil 30 is eliminated, then no maintaining circuits are provided for the relay coil 30 so that as soon as the motor vehicle brakes are released the relay mechanism is deenergized. As a result, the contact 34 moves into engagement with the contact 35 upon release of the brakes for illuminating the ambler signal light 26.

For simplicity in and cost reduction of the manufacture and installation of the signal light system of this invention, the single pole double throw switch 19, operated by the accelerator mechanism, is preferably a mercury switch such as is illustrated in Figs. 2 and 3. Here the mercury switch has a pair of end contacts 39 and 40 and an intermediate contact 38 in the form of mercury, which in turn always engages an electrode which is electrically connected to the ignition switch 48 of the motor vehicle. When the switch is tilted to the position illustrated in Fig. 2 the mercury bridges the center electrode and the contact 39, and when the switch is tilted to the opposite position the mercury bridges the center electrode and the contact 40 thereby providing a single pole double throw switching action. This mercury switch is permanently electrically connected by the wires 20 to the relay mechanism 13. The mercury switch 19 is carried by fingers 50 of a clip member 51. The clip member 51 is pivotally mounted on a clamp member 54 by means of a screw or rivet 52 passing through a hole in the clip member 51 and secured in a hole 53 in the clamp member 54. The clip member 51 is also provided with an arcuate slot 55 for receiving a screw 56 screw-threadedly mounted in a screw-threaded hole 57 in the clamp member 54. Thus, the clip member 51 and, hence, the mercury switch may be rotatably adjusted with respect to the clamp member 54 and may be secured in adjusted position by tightening the screw 56. The clamp member 54 has a flange 58 and a thumbscrew 59 for clamping the same to the pivoted lever 16 of the accelerator linkage mechanism, this pivoted lever 16 being pivoted to a stationary pivot pin 60. The rotatable position of the mercury switch 19 is adjusted so that when the accelerator is released the mercury 38 bridges the center electrode and the contact 39, as indicated in Fig. 2.

When the accelerator is depressed the pivoted lever 16 is rotated and the mercury switch 19 is tilted to cause the mercury 38 to flow to the other end of the switch to bridge the center electrode and the contact 40 for illuminating the green signal light 27. When the accelerator is depressed, of course the automobile moves forwardly and this forward motion of this automobile operates to assist in the movement of the mercury 38 into engagement with the contact 40. When the accelerator is released the pivoted lever 16 is rotated in the opposite direction to tilt the mercury switch 19 to the position illustrated in Fig. 2 to cause the mercury 38 to engage the contact 39. Release of the accelerator causes retarding of the forward travel of the automobile and, as a result, this aids in the movement of the mercury 38 into engagement with the contact 39. Thus the inertia effects of the mercury 38 operate in conjunction with the tilting of the mercury switch 19 in completing circuits through the contacts 39 and 40 so that the construction of the mercury switch need not be extremely critical.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. In a signal light system for a motor vehicle having red, ambler and green signal lights, a relay including a relay coil and a single pole double throw switch operated thereby, an electrical connection for the relay coil from the standard stop light switch of the motor vehicle for energizing the relay when the motor vehicle brakes are applied, a second single pole double throw switch, means operated by the accelerator mechanism of the motor vehicle for operating the second single pole double throw switch, electrical connections for the two single pole double throw switches for connecting the same in series between the motor vehicle voltage source and the red, amber and green signal lights for illuminating the green signal light when the motor vehicle accelerator is depressed, for illuminating the amber signal light when the motor vehicle accelerator is released and for illuminating the red signal light when the motor vehicle brakes are applied, and an electrical connection between the relay coil and the single pole double throw switch operated thereby for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

2. In a signal light system for a motor vehicle having red, amber and green signal lights, a relay including first and second relay coils and a single pole double throw switch operated thereby, an electrical connection for the first relay coil from the standard stop light switch of the motor vehicle for energizing the relay when the motor vehicle brakes are applied, a second single pole double throw switch, means operated by the accelerator mechanism of the motor vehicle for operating the second single pole double throw switch, electrical connections for the two single pole double throw switches for connecting the same in series between the motor vehicle voltage source and the red, amber and green signal lights for illuminating the green signal light when the motor vehicle accelerator is depressed, for illuminating the amber signal light when the motor vehicle accelerator is released and for illuminating the red signal light when the motor vehicle brakes are applied, and an electrical connection between the second relay coil and the single pole double throw switch operated thereby for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

3. In a signal light system for a motor vehicle having red, amber and green signal lights, a relay including a relay coil and a single pole double throw switch operated thereby, an electrical connection including a rectifier for the relay coil from the standard stop light switch of the motor vehicle for energizing the relay when the motor vehicle brakes are applied, a second single pole double throw switch means operated by the accelerator mechanism of the motor vehicle for operating the second single pole double throw switch, electrical connections for the two single pole double throw switches for connecting the same in series between the motor vehicle voltage source and the red, amber and green signal lights for illuminating the green signal light when the motor vehicle accelerator is depressed, for illuminating the amber signal light when the motor vehicle accelerator is released and for illuminating the red signal light when the motor vehicle brakes are applied, and an electrical connection between the relay coil and the single pole double throw switch operated thereby for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

4. In a signal light system for a motor vehicle having red, amber and green signal lights, a relay including a relay coil and a single pole double throw switch operated thereby, said single pole double throw switch including first and second contacts and an armature contact normally engaging the first contact but engaging the second contact when the relay is energized, an electrical connection for the relay coil from the standard stop light switch of the motor vehicle for energizing the relay when the motor vehicle brakes are applied, a second single pole double throw switch including first and second contacts and a movable contact, means operated by the accelerator mechanism of the motor vehicle for bridging the movable contact and the first contact when the accelerator is released and for bridging the movable contact and the second contact when the accelerator is depressed, an electrical connection for the movable contact of the second single pole double throw switch from the motor vehicle voltage source, an electrical connection for the second contact of the second single pole double throw switch from the green signal light, an electrical connection between the first contact of the second single pole double throw switch and the armature contact of the relay, an electrical connection for the first contact of the relay from the amber signal light, an electrical connection for the second contact of the relay from the red signal light, the arrangement being such that green signal light is illuminated when the motor vehicle accelerator is depressed, the amber signal light is illuminated when the motor vehicle accelerator is released and the red signal light is illuminated when the motor vehicle brakes are applied, and an electrical connection between the relay coil and the second contact of the relay for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

5. In a signal light system for a motor vehicle having red, amber and green signal lights, a relay including first and second relay coils and a single pole double throw switch operated thereby, said single pole double throw switch including first and second contacts and an armature contact normally engaging the first contact but engaging the second contact when the relay is energized, an electrical connection for the first relay coil from the standard stop light switch of the motor vehicle for energizing the relay when the motor vehicle brakes are applied, a second single pole double throw switch including first and second contacts and a movable contact, means operated by the accelerator mechanism of the motor vehicle for bridging the movable contact and the first contact when the accelerator is released and for bridging the movable contact and the second contact when the accelerator is depressed, an electrical connection for the movable contact of the second single pole double throw switch from the motor vehicle voltage source, an electrical connection for the second contact of the second single pole double throw switch from the green signal light, an electrical connection between the first contact of the second single pole double throw switch and the armature contact of the relay, an electrical connection for the first contact of the relay from the amber signal light, an electrical connection for the second contact of the relay from the red signal light, the arrangement being such that green signal light is illuminated when the motor vehicle accelerator is depressed, the amber signal light is illuminated when the motor vehicle accelerator is released and the red signal light is illuminated when the motor vehicle brakes are applied, and an electrical connection the second relay coil and the second contact of the relay for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

6. In a signal light system for a motor vehicle having red, amber and green signal lights, a relay including a relay coil and a single pole double throw switch operated thereby, said single pole double throw switch including first and second contacts and an armature contact normally engaging the first contact but engaging the second contact when the relay is energized, an electrical connection including a rectifier for the relay coil from the standard stop light switch of the motor vehicle for energizing the relay when the motor vehicle brakes are applied, a second single pole double throw switch including first and second contacts and a movable contact, means operated by the accelerator mechanism of the motor vehicle for bridging the movable contact and the first contact when the accelerator is released and for bridging the movable contact and the second contact when the accelerator is depressed, an electrical connection for the movable contact of the second single pole double throw switch from the motor vehicle voltage source, an electrical connection for the second contact of the second single pole double throw switch from the green signal light, an electrical connection between the first contact of the second single pole double throw switch and the armature contact of the relay, an electrical connection for the first contact of the relay from the amber signal light, an electrical connection for the second contact of the relay from the red signal light, the arrangement being such that green signal light is illuminated when the motor vehicle accelerator is depressed, the amber signal light is illuminated when the motor vehicle accelerator is released and the red signal light is illuminated when the motor vehicle brakes are applied, and an electrical connection between the relay coil and the second contact of the relay for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

7. In a signal light system for a motor vehicle having a brake mechanism including a stop light switch and an accelerator mechanism including a pivoted lever and having red, amber and green signal lights, a relay mounted under the motor vehicle hood adjacent the accelerator mechanism and including a relay coil and a single pole double throw switch operated thereby, an electrical connection for the relay coil from the standard stop light switch of the motor vehicle for energizing the relay when the motor vehicle brakes are applied, a single pole double throw mercury switch, means for mounting the single pole double throw mercury switch on the pivoted lever of the motor vehicle accelerator mechanism for tilting the same as the accelerator mechanism is operated, electrical connections, including permanent connections between the two single pole double throw switches, for connecting the two single pole double throw switches in series between the motor vehicle voltage source and the red, amber and green signal lights for illuminating the green signal light when the motor vehicle accelerator is depressed, for illuminating the amber signal light when the motor vehicle accelerator is released and for illuminating the red signal light when the motor vehicle brakes are applied, and an electrical connection between the relay coil and the single pole double throw switch operated thereby for maintaining the relay energized after it is energized by the standard stop light switch until the second single pole double throw switch is operated to illuminate the green signal light for maintaining the red signal light illuminated after release of the motor vehicle brakes until the motor vehicle accelerator is depressed to illuminate the green signal light.

8. In a signal light system for a motor vehicle having red and amber signal lights, a relay including a relay coil and a single pole double throw switch operated thereby, an electrical connection for the relay coil from the standard stop light switch of the motor vehicle for energizing the relay when the motor vehicle brakes are applied, a second switch, means operated by the accelerator mechanism of the motor vehicle for operating the second switch, electrical connections for the single pole double throw switch and the second switch for connecting the same in series between the motor vehicle voltage source and the red and amber signal lights for illuminating the amber signal light when the motor vehicle accelerator is released and for illuminating the red signal light when the motor vehicle brakes are applied, and an electrical connection between the relay coil and the single pole double throw switch operated thereby for maintaining the relay energized after it is energized by the standard stop light switch until the second switch is operated by depressing the accelerator mechanism for maintaining the red signal light illuminated after release of the motor vehicle brakes until the motor vehicle accelerator is depressed.

9. In a signal light system for a motor vehicle having a brake mechanism including a stop light switch and an accelerator mechanism including a pivoted lever and having red and amber signal lights, a relay mounted under the motor vehicle hood adjacent the accelerator mechanism and including a relay coil and a single pole double throw switch operated thereby, an electrical connection for the relay coil from the standard stop light switch of the motor vehicle for energizing the relay when the motor vehicle brakes are applied, a mercury switch, means for mounting the mercury switch on the pivoted lever of the motor vehicle accelerator mechanism for tilting the same as the accelerator mechanism is operated, electrical connections, including permanent connections between the two switches, for connecting the two switches in series between the motor vehicle voltage source and the red and amber signal lights for illuminating the amber signal light when the motor vehicle accelerator is released and for illuminating the red signal light when the motor vehicle brakes are applied, and an electrical connection between the relay coil and the single pole double throw switch operated thereby for maintaining the relay energized after it is energized by the standard stop light switch, until the mercury switch is operated by depressing the accelerator mechanism, for maintaining the red signal light illuminated after release of the motor vehicle brakes until the motor vehicle accelerator is depressed.

10. In a signal light system for a motor vehicle having a brake mechanism including a standard stop light switch and an accelerator mechanism including a pivoted lever, a signal light housing having red, amber and green signal lights, a mercury switch including electrodes and a pool of mercury for bridging the same, means for mounting the mercury switch on the pivoted lever of the accelerator mechanism for tilting the same as the accelerator mechanism is operated, and means electrically connected to the red, amber and green signal lights, the standard stop light switch and the mercury switch for illuminating the green signal light when the motor vehicle accelerator is depressed, for illuminating the amber signal light when the motor vehicle accelerator is released and for illuminating the red signal light when the motor vehicle brakes are applied, the mercury switch being so positioned with respect to the direction of movement of the motor vehicle that deceleration of the motor vehicle tends to cause the pool of mercury to move in a direction with respect to the electrodes thereof for illuminating the amber signal light and that acceleration of the motor vehicle tends to cause the pool of mercury to move in a direction with respect to the electrodes thereof for illuminating the green signal light.

11. In a signal light system for a motor vehicle having a brake mechanism including a standard stop light switch and an accelerator mechanism including a pivoted lever, a signal light housing having red and amber signal lights, a mercury switch including electrodes and a pool of mercury for bridging the same, means for mounting the mercury switch on the pivoted lever of the accelerator mechanism for tilting the same as the accelerator mechanism is operated, and means electrically connected to the red and amber signal lights, the standard stop light switch and the mercury switch for illuminating the amber signal light when the motor vehicle accelerator is released and for illuminating the red signal light when the motor vehicle brakes are applied, the mercury switch being so positioned with respect to the direction of movement of the motor vehicle that deceleration of the motor vehicle tends to cause the pool of mercury to move with respect to the electrodes thereof for illuminating the amber signal light and the acceleration of the motor vehicle tends to cause the pool of mercury to move in a direction with respect to the electrodes for extinguishing the amber signal light.

12. In a signal light system for a motor vehicle having an accelerator mechanism including a pivoted lever, a signal light housing having amber and green signal lights, a mercury switch including electrodes and a pool of mercury for bridging the same, means for mounting the mercury switch on the pivoted lever of the accelerator mechanism for tilting the same as the accelerator mechanism is operated, and means electrically connected to the amber and green signal lights and the mercury switch for illuminating the green signal light when the motor vehicle accelerator is depressed and for illuminating the amber signal light when the motor vehicle accelerator is released, the mercury switch being so positioned with respect to the direction of movement of the motor vehicle that deceleration of the motor vehicle tends to cause the pool of mercury to move in a direction with respect to the electrodes thereof for illuminating the amber signal light and that acceleration of the motor vehicle tends to cause the pool of mercury to move in a direction with respect to the electrodes thereof for illuminating the green signal light.

13. In a signal light system for a motor vehicle having a brake mechanism including a standard stop light switch and an accelerator mechanism including a pivoted lever, a signal light housing having red, amber and green signal lights, a mercury switch including electrodes and a pool of mercury for bridging the same, a clip member carrying the mercury switch, a clamp member secured to the pivoted lever of the accelerator mechanism, means for pivotally adjustably securing the clip member to the clamp member so as to tilt the mercury switch as the accelerator mechanism is operated and to adjust the position of the mercury switch with respect to the position of the pivoted lever, and means electrically connected to the red, amber and green signal lights, the standard stop light switch and the mercury switch for illuminating the green signal light when the motor vehicle accelerator is depressed, for illuminating the amber signal light when the motor vehicle accelerator is released and for illuminating the red signal light when the motor vehicle brakes are applied.

14. In a signal light system for a motor vehicle having a brake mechanism including a standard stop light switch and an accelerator mechanism including a pivoted lever, a signal light housing having red and amber signal lights, a mercury switch including electrodes and a pool of mercury for bridging the same, a clip member carrying the mercury switch, a clamp member secured to the pivoted lever of the accelerator mechanism, means for pivotally adjustably securing the clip member to the clamp member so as to tilt the mercury switch as the accelerator mechanism is operated and to adjust the position of the mercury switch with respect to the position of the pivoted lever, and means electrically connected to the red and amber signal lights, the standard stop light switch and the mercury switch for illuminating the amber signal light when the motor vehicle accelerator is released and for illuminating the red signal light when the motor vehicle brakes are applied.

15. In a signal light system for a motor vehicle having an accelerator mechanism including a pivoted lever, a signal light housing having amber and green signal lights, a mercury switch including electrodes and a pool of mercury for bridging the same, a clip member carrying the mercury switch, a clamp member secured to the pivoted lever of the accelerator mechanism, means for pivotally adjustably securing the clip member to the clamp member so as to tilt the mercury switch as the accelerator mechanism is operated and to adjust the position of the mercury switch with respect to the position of the pivoted lever, and means electrically connected to the amber and green signal lights and the mercury switch for illuminating the green signal light when the motor vehicle accelerator is depressed and for illuminating the amber signal light when the motor vehicle accelerator is released.

References Cited in the file of this patent

UNITED STATES PATENTS

| | | |
|---|---|---|
| 1,729,071 | Gilbert | Sept. 24, 1929 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,513,712 | Coombs | July 4, 1950 |